US008488707B2

(12) United States Patent
Hyeon et al.

(10) Patent No.: US 8,488,707 B2
(45) Date of Patent: Jul. 16, 2013

(54) MULTI-ANTENNA SUBSYSTEM FOR SOFTWARE DEFINED RADIO

(75) Inventors: Seung-Heon Hyeon, Seoul (KR); June Kim, Incheon-si (KR); Seung-Won Choi, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 414 days.

(21) Appl. No.: 12/744,610

(22) PCT Filed: Nov. 28, 2008

(86) PCT No.: PCT/KR2008/007071
§ 371 (c)(1),
(2), (4) Date: May 25, 2010

(87) PCT Pub. No.: WO2009/069981
PCT Pub. Date: Jun. 4, 2009

(65) Prior Publication Data
US 2010/0246727 A1    Sep. 30, 2010

(30) Foreign Application Priority Data

Nov. 28, 2007  (KR) .......................... 10-2007-0122196

(51) Int. Cl.
*H04B 7/02*    (2006.01)

(52) U.S. Cl.
USPC ........... 375/267; 375/260; 375/262; 375/265; 375/340; 375/343; 375/346; 375/347; 375/373; 375/375

(58) Field of Classification Search
USPC ................. 375/267, 340, 260, 262, 265, 343, 375/346, 347, 350, 373, 375; 370/203, 204, 370/205, 208, 209, 210
See application file for complete search history.

(56) References Cited

U.S. PATENT DOCUMENTS

| 7,302,269 | B1 * | 11/2007 | Crawford et al. | .......... 455/456.1 |
| 8,019,285 | B2 * | 9/2011 | Nakamura | .................... 455/63.4 |
| 2006/0176077 | A1 * | 8/2006 | Grabill et al. | .................... 326/39 |

OTHER PUBLICATIONS

Seungheon Hyun, "Standardizing smart antenna API for SDR networks", Sep. 2007.*
Ahmed, E., et al., "Universal MIMO-OFDM SDR for Mobile Autonomous Networks," Nov. 24, 2004.
Palchak, D., et al., "A Software Defined Radio Testbed for MIMO Systems," 2006 SDR Forum, Dec. 31, 2006.
Gupta, A., et al., "Rapid MOMO-OFDM Software Defined Radio System Prototyping," 2004 IEEE, Dec. 31, 2004.
International Search Report and Written Opinion of the International Searching Authority, PCT/KR2008/007071, date of mailing Jun. 29, 2009.

* cited by examiner

*Primary Examiner* — Dhaval Patel
(74) *Attorney, Agent, or Firm* — Hamilton, Brook, Smith & Reynolds, P.C.

(57) ABSTRACT

The present invention relates to a multi-antenna subsystem for a SDR (software defined radio) capable of supporting a multi-antenna technique to an antenna system using a multi-antenna subsystem. The multi-antenna subsystem of a multi-antenna system includes an algorithm executing unit for carrying out an algorithm for a multi-antenna technique to be required in the multi-antenna system, a frame synchronization unit for a synchronization acquisition, and a control unit for controlling the algorithm executing unit and the frame synchronization. The algorithm executing unit has a plurality of functional blocks and the functional block has state information, which can be referred by other functional blocks, for supporting SDR system.

11 Claims, 8 Drawing Sheets

US 8,488,707 B2

MULTI-ANTENNA SUBSYSTEM FOR SOFTWARE DEFINED RADIO

This application is the U.S. National Stage of International Application No. PCT/KR2008/007071, filed Nov. 28, 2008, which designates the U.S., published in English, and claims priority under 35 U.S.C. §§119 or 365(c) to Korean Application No. 10-2007-0122196, filed Nov. 28, 2007.

TECHNICAL FIELD

The embodiments described herein relate to a multi-antenna subsystem capable of making a software defined radio (hereinafter, referred to as SDR) system support a multi-antenna technology.

BACKGROUND ART

Recently, as different telecommunication standards have been defined with the development of wireless telecommunication systems which have been rapidly developed, SDR technologies which are capable being applied to the different telecommunication specifications have been also developed. The SDR technologies make it possible to implement the different telecommunication specifications and various telecommunication technologies, without hardware changes or upgrades in the telecommunication systems, by providing openness, interoperability and embedment to the wireless telecommunication systems.

FIG. 1 is a schematic block diagram illustrating a conventional single antenna system. Referring to FIG. 1, the conventional single antenna system can be divided into a modem subsystem and an RF/IF subsystem, approximately; however, multi-antenna technologies are not considered into the single antenna system. Accordingly, this conventional single antenna system does not cope with the rapidly developed telecommunication environments.

Furthermore, the multi-antenna system has no a structure which can be implemented by simply providing a plurality of the single antenna systems each of which supports the conventional SDR system. To support this multi-antenna system, there should be provided various algorithms, such as a signal detection algorithm and a space-time coding algorithm and also provided a solution for a synchronization problem in the multi-antenna system. Furthermore, there should be provided a control unit to control the multi-antenna system in such a manner that the SDR system works with the multi-antenna system.

DISCLOSURE

Technical Problem

To solve the problem of a SDR system which does not support a multi-antenna system, a multi-antenna subsystem capable of making the SDR system support multi-antenna technologies, by providing an additional system without a change in hardware, is described herein.

Furthermore, a multi-antenna subsystem having a PIM (Platform independent model) based on an open architecture, which is applicable to various multi-antenna systems, is described herein.

Technical Solution

According to one aspect, a multi-antenna system for a SDR system comprises an RF/IF subsystem coupled to a multi-antenna, a modem subsystem configured to process input data from the RF/IF subsystem, and a multi-antenna subsystem configured to execute a specific algorithm with the RF/IF subsystem and modem subsystem, wherein the multi-antenna subsystem includes an algorithm executing unit configured to execute the specific algorithm of the multi-antenna system, a synchronization unit configured to acquire synchronization of the multi-antenna system, and a control unit configured to control the algorithm executing unit and the synchronization unit.

According to another aspect, a multi-antenna system for a SDR system comprises an RF/IF subsystem coupled to a multi-antenna, a modem subsystem configured to process input data from the RF/IF subsystem, and a multi-antenna subsystem configured to form a beam by controlling the RF/IF subsystem, wherein the multi-antenna subsystem includes a plurality of functional units to control the multi-antenna system, and wherein the plurality of functional units includes a control functional unit configured to control algorithms which are executed by a digital signal processor and the RF/IF subsystem, a synchronization functional unit configured to execute a calibration and a symbol synchronization, and an algorithm functional unit configured to execute an algorithm which is required to form the beam and in multi-antenna system.

According to further another aspect, a multi-antenna system for a SDR system comprises an RF/IF subsystem coupled to a multi-antenna, a modem subsystem configured to process input data from the RF/IF subsystem, and a multi-antenna subsystem including a list of a plurality of algorithms to be executed and state information indicative of an activation of the algorithm in order to execute various functions, being communicated with the RF/IF subsystem and the modem subsystem.

According to still another aspect, a multi-antenna system for a SDR system comprises an RF/IF subsystem coupled to a multi-antenna, a modem subsystem configured to process input data from the RF/IF subsystem, and a multi-antenna subsystem configured to control the RF/IF subsystem and the modem subsystem, including an algorithm unit to execute additional functions, wherein the algorithm unit in the multi-antenna subsystem includes functional blocks which have state information in order to execute a plurality of functions, wherein the functional blocks shares the state information with each other, and where the state information are referred to by the functional blocks.

BEST MODE

Hereinafter, examples and exemplary embodiments of the present disclosure will be described with reference to accompanying drawings. However, the examples and embodiments are for illustrative purposes only and are not intended to limit the scope of the invention.

Figure 1:
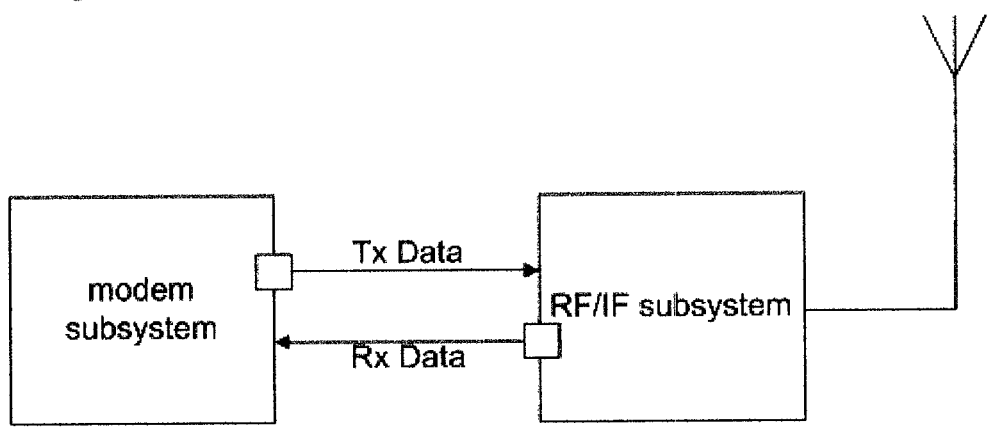
FIG. 1 is a schematic block diagram illustrating a conventional single antenna system to which an SDR system is adopted.
Figure 2:
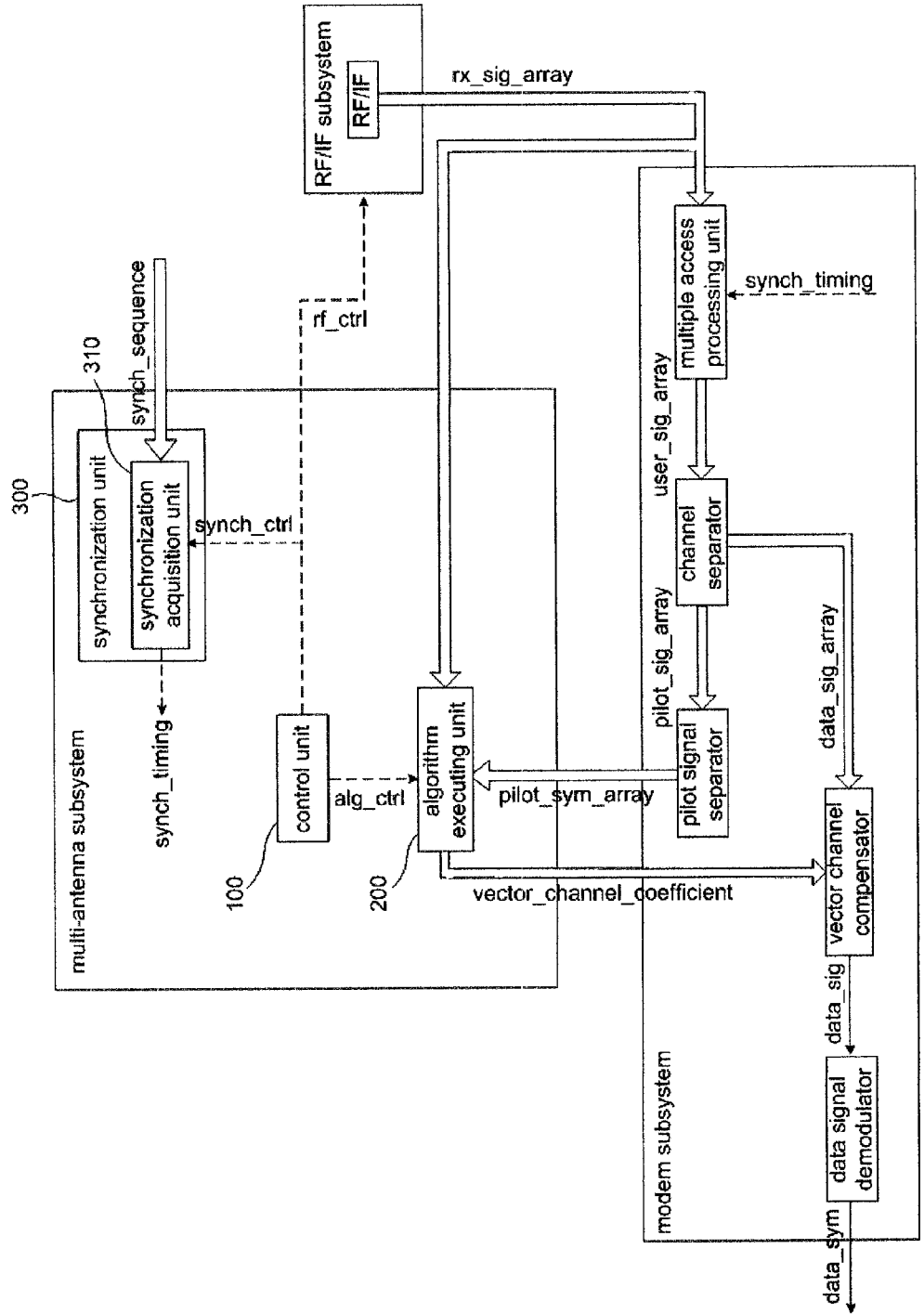
FIG. 2 is a schematic block diagram illustrating an entire structure of a multi-antenna system having a multi-antenna subsystem according to the present disclosure.

First, FIG. 2 is a schematic block diagram illustrating an entire structure of a MIMO (multi-input multi-output) smart antenna system having a multi-antenna subsystem for a SDR system according one embodiment of the present disclosure. Referring to FIG. 2, the smart antenna system (also, referred to as "multi-antenna system") according to the present disclosure can include a modem subsystem, an RF/IF subsystem and a multi-antenna subsystem. The modem subsystem and the RF/IF subsystem are essentially provided to a typical multi-antenna system; however, these are incorporated into the multi-antenna subsystem of present disclosure to provide different characteristics of the smart antenna system.

The multi-antenna subsystem according to the present disclosure can include an algorithm executing unit 200 configured to execute different algorithms, such as a spatial multiplexing algorithm and a space-time coding algorithm, by using a pilot signal pilot_sym_array extracted from received signals rx_sig_array which are input through a multiple antenna, a synchronization unit 300 having a synchronization acquisition unit 310 configured to estimate a frame synchronization and a symbol synchronization of a multi-antenna system using a synchronization sequence synch_sequence which is received through the multiple antenna, and a control unit 100 configured to control the algorithm executing unit 200, the synchronization unit 300 and the RF/IF subsystem.

In more detail, to perform an algorithm to estimate a vector channel while the signal transmitted from a transmitter are received by antennas in a receiver, the algorithm executing unit 200 receives the pilot signal pilot_sym_array from the modem subsystem and then provides a vector channel coefficient vector_channel_coefficient, which is estimated by using the pilot signal pilot_sym_array, to the modem subsystem.

The synchronization acquisition unit 310 in the synchronization unit 300 executes a frame/symbol synchronization of the multi-antenna system, obtains a synchronization sequence synch_sequence for acquiring a synchronization from the outside of the multi-antenna subsystem, and provides a synchronization time, which is acquired from the synchronization sequence synch_sequence, to the modem subsystem to demodulate the signals.

The control unit 100 includes interfaces to control the algorithm executing unit 200, the synchronization unit 300, and the RF/IF subsystem outside the multi-antenna subsystem.

Figure 3:
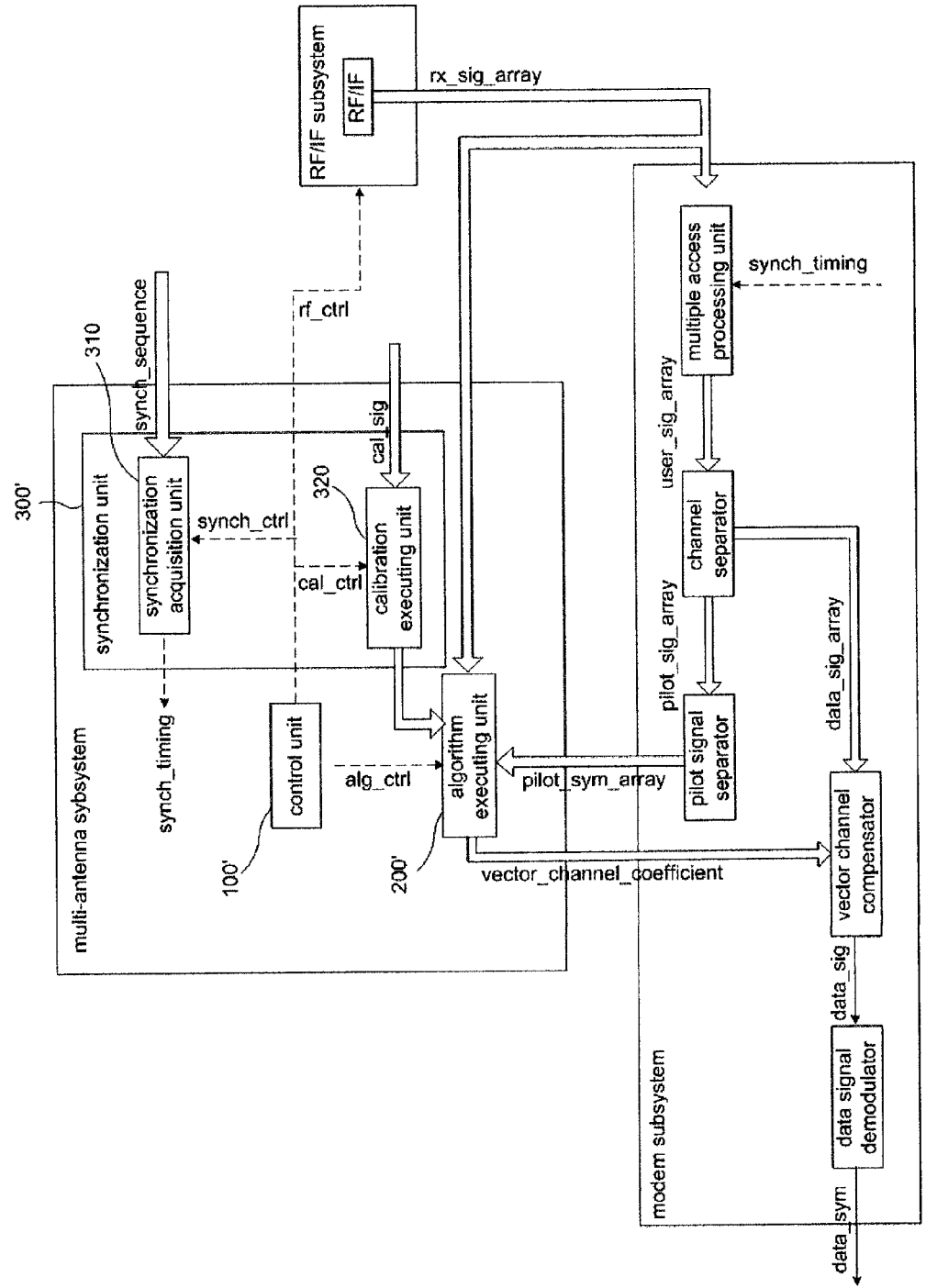
FIG. 3 is a block diagram illustrating a beamforming smart antenna system in which a calibration algorithm for beamforming is embedded in the multi-antenna subsystem in FIG. 2.

FIG. 3 is a block diagram illustrating a beamforming smart antenna system in which a calibration algorithm for beamforming is embedded in the multi-antenna subsystem in FIG. 2.

Referring to FIG. 3, the beamforming multi-antenna subsystem can include an algorithm executing unit 200', a synchronization unit 300', and a control unit 100'. The algorithm executing unit 200' executes an algorithm to form a beam by using a pilot signal pilot_sym_array extracted from received signals rx_sig_array which are received by a multiple antenna. The synchronization unit 300' can include a synchronization acquisition unit 310 to estimate a frame synchronization and a symbol synchronization of the multi-antenna using a synchronization sequence synch_sequence which is received by the multi-antenna and a calibration unit 320 to produce a calibration value cal_val for the beamforming of the multi-antenna. The control unit 100' is configured to control the algorithm executing unit 200', the synchronization unit 300', and an RF/IF subsystem.

The algorithm executing unit 200', which receives the pilot signal pilot_sym_array from the modem subsystem to execute the beamforming algorithm, provides vector channel coefficients that are calculated by using the pilot signal pilot_sym_array, to the modem subsystem. Furthermore, as mentioned above, in the case where the multi-antenna system operates as the beamforming system, the algorithm executing unit 200' receives the calibration value cal_val from the calibration unit 320 in the synchronization unit 300'.

The synchronization acquisition unit 310 of the synchronization unit 300' receives the synchronization sequence synch_sequence for the synchronization from the outside of the multi-antenna subsystem, executes the frame/symbol synchronization of the multi-antenna system, and then provides the synchronization time acquired from the synchronization acquisition unit 310 to the modem subsystem for the signal demodulation. In the case where the multi-antenna system operates as the beamforming system, the calibration unit 320 of the synchronization unit 300' receives a calibration signal cal_sig from the outside of the multi-antenna subsystem for the beamforming and executes a multi-antenna calibration function. The calibration value is provided to the algorithm executing unit 200' and this is used to calculate the exact weight vector.

The control unit 100' controls the executing unit 200', the synchronization acquisition unit 310 and the calibration unit 320 of the synchronization unit 300' and also controls the RF/IF subsystem.

On the other hand, the multi-antenna subsystem in FIG. 2 is configured to implement an open architecture which is capable of executing a multi-antenna algorithm, being attached to different multi-antenna systems. To achieve this open architecture, the multi-antenna subsystem according to the present disclosure includes various functional blocks each of which can execute a specific operation.

Figure 4:
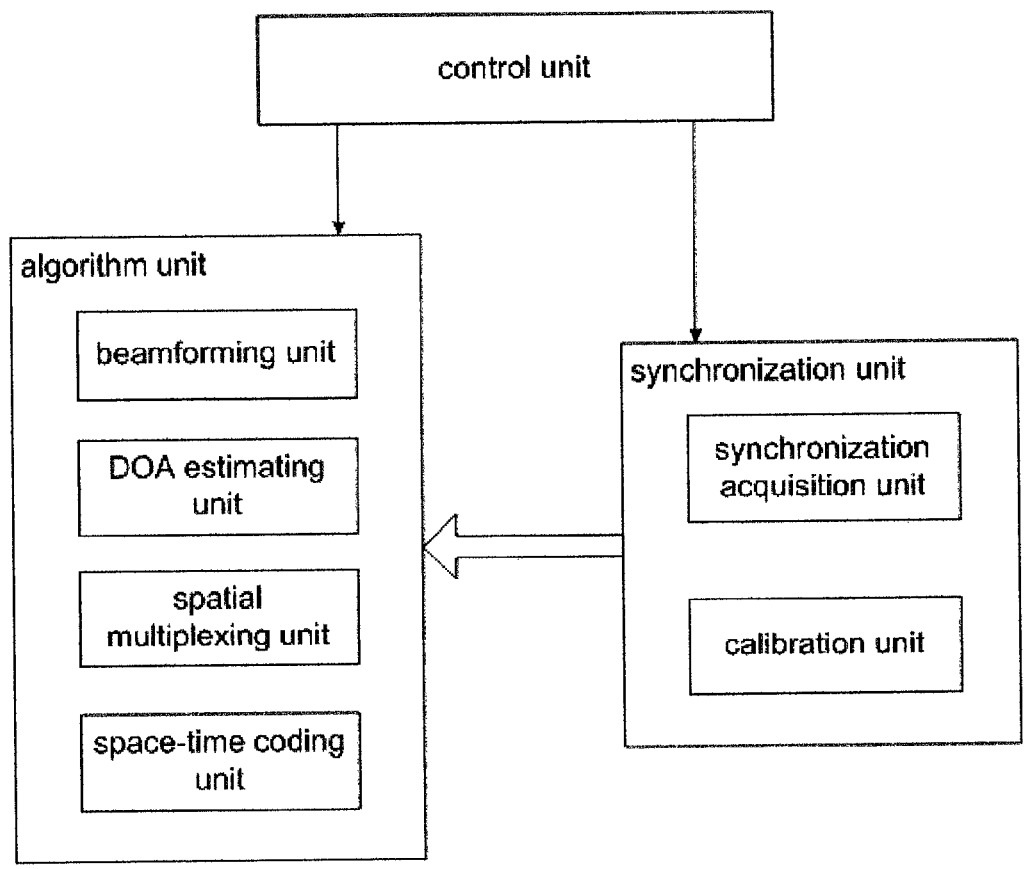
FIG. 4 is a block diagram illustrating functional blocks in the beamforming multi-antenna subsystem in FIG. 3.

FIG. 4 shows an example of a structure of the various functional blocks in the multi-antenna subsystem. Referring to FIG. 4, the multi-antenna subsystem can include a control unit, an algorithm unit, and a synchronization unit. The algorithm unit can include various functional blocks, such as a beamforming unit to calculate weight vectors using a specific algorithm, a direction-of-arrival (DOA) estimation unit to estimate a DOA angle, a spatial multiplexing unit, and a time multiplexing unit. The synchronization unit can include functional blocks, such as a synchronization acquisition unit and a calibration unit. These functional blocks cooperate with each other for the beamforming multi-antenna subsystem. That is, they use attributions, which are indicative of state information about their own status, and ports which are called as a series of data flow.

The attributions can provide state information stored in a memory to other functional blocks and this state information stored in the memory can be changed or modified by its functional block or by other functional blocks. That is, the algorithm unit can include functional blocks having the state information to execute different functions and the functional blocks shares the state information with each other in order that the functional blocks mutually refer to the state information. Examples of the attributions are shown below.

A. Attribution of Control Unit
  1) reference to the algorithm unit cooperating with the control unit
  2) reference to the synchronization unit cooperating with the control unit
  3) reference to the RF/IF unit cooperating with the control unit
  4) the number of antennas
B. Common Attributions of Algorithm Unit
  1) state information indicative of an activation of the algorithm unit
  2) state information indicative of an operating mode of the algorithm unit
  3) information about a list of algorithms that can be executed by the algorithm unit
  4) information about an algorithms that is currently activated among the list
    b1. Attribution of Beamforming Algorithm Unit
      1) weight attribution
      2) received data before a weight calculation
      3) received data after processed for the weight calculation
    b2. Attribution of Spatial Multiplexing Algorithm Unit
      1) list of valid spatial multiplexing algorithms
      2) activated spatial multiplexing algorithm
    b3. Attribution of a Space-Time Coding Algorithm Unit
      1) space-time code mapping value
    b4. Attribution of DOA (Direction-of-Arrival) Estimating Algorithm Unit
      1) the number of signals of which arrival angles are detected
      2) list of the arrival angles of the detected signals
C. Attribution of Synchronization Unit
  c1. Attribution of Synchronization Acquisition
    1) search time to find out the synchronization
    2) time information of symbols for searching the synchronization
    3) critical reference value for searching synchronization signal
  c2. Attribution of Calibration Unit
    1) state information indicative of whether the calibration is continuously executed or once
    2) period time of the calibration
    3) time which is taken to execute the calibration The ports functions as data paths to provide a series of data flows which are processed by each unit of the multi-antenna subsystem and they can be classified into two sections. A first section is between the modem subsystem and the algorithm unit and a second section is between the algorithm and the RF/IF subsystem.

Hereinafter, the data flows are illustrated at each port blow. The port which is associated with the modem subsystem is called as a modem port, the port which is associated with the algorithm unit is called as an algorithm port, and the port which is associated with the RF/IF subsystem t is called as an RF/IF port. Furthermore, the numbers in parenthesis designates the order of the illustration in drawing.

Figure 5:
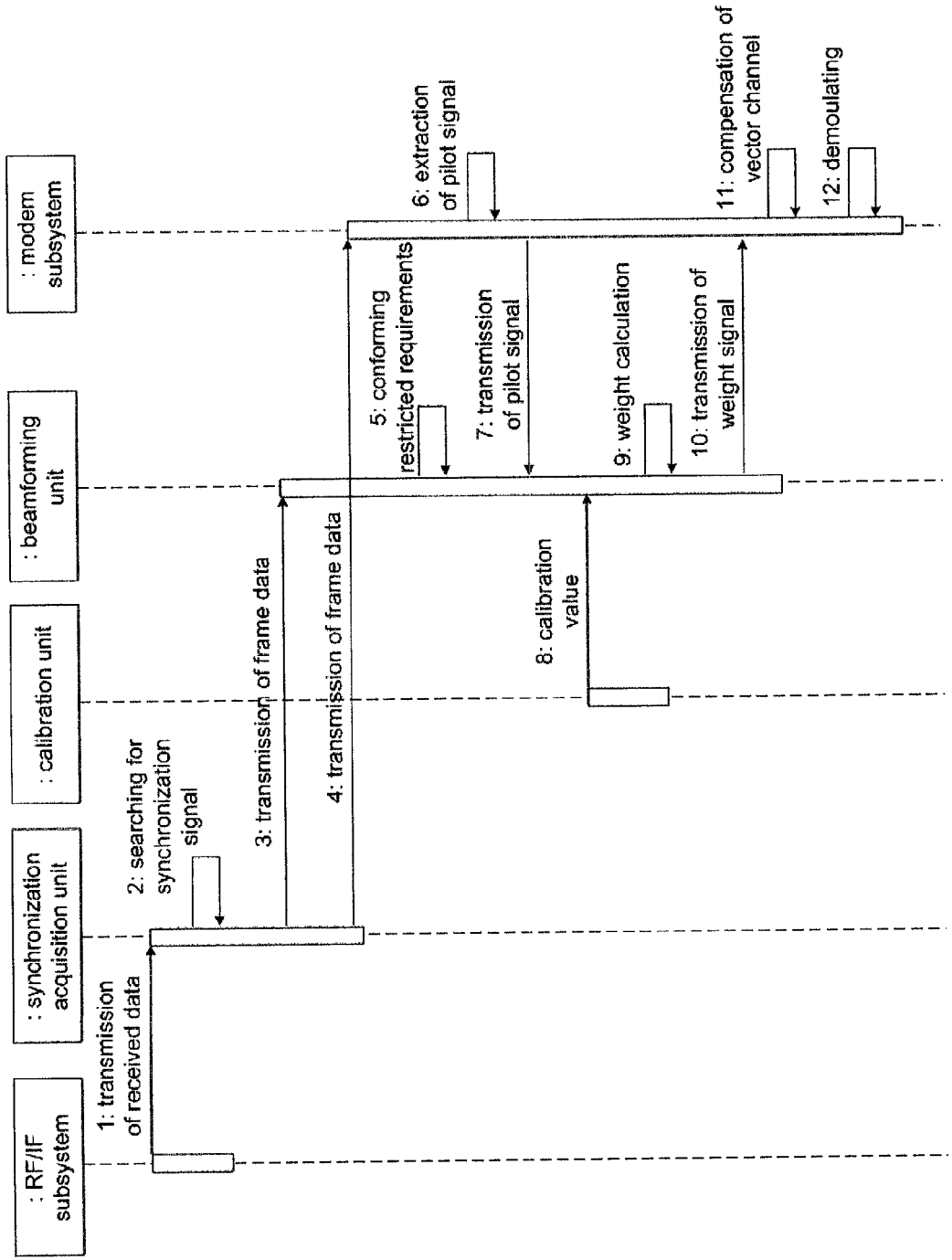
FIG. 5 is a flow chart illustrating operating procedures of the multi-antenna subsystem in a beamforming mode.

The procedures, which are taken when the multi-antenna subsystem executes the beamforming function, are shown in FIG. 5. When wireless signals, which are transmitted at a transmitting side, are received by the RF/IF subsystem at a receiving side, they are transmitted to the synchronization unit of the multi-antenna subsystem (step 1). The synchronization unit searches for the synchronization signal referring to the above-mentioned attribution of the synchronization unit, packetizes it symbol by symbol, and produces a frame signal by gathering the packets again (step 2). This frame data are provided to the beamforming unit and the modem subsystem (steps 3 and 4). The beamforming unit which receives the frame data selects an algorithm, that is indicated by a currently activated algorithm attribution (B. 4), from the algorithm list to be executed by the algorithm unit (B. 3) and determines the execution of the algorithm by referring to the state information indicative of an activation of the algorithm (B. 1) (step 5). When the beamforming algorithm is executed, the weights are calculated (step 9) using the pilot signal extracted by the modem subsystem that have received the frame data (steps 6 and 7), the calibration value measured by the calibration unit (step 8), and the frame data that have been transmitted from the synchronization unit. The calculated weights are stored as the weight attribution (b1, 1) and also transmitted to the modem subsystem (step 10). The transmitted weights are used for the compensation of the frame data.

Figure 6:
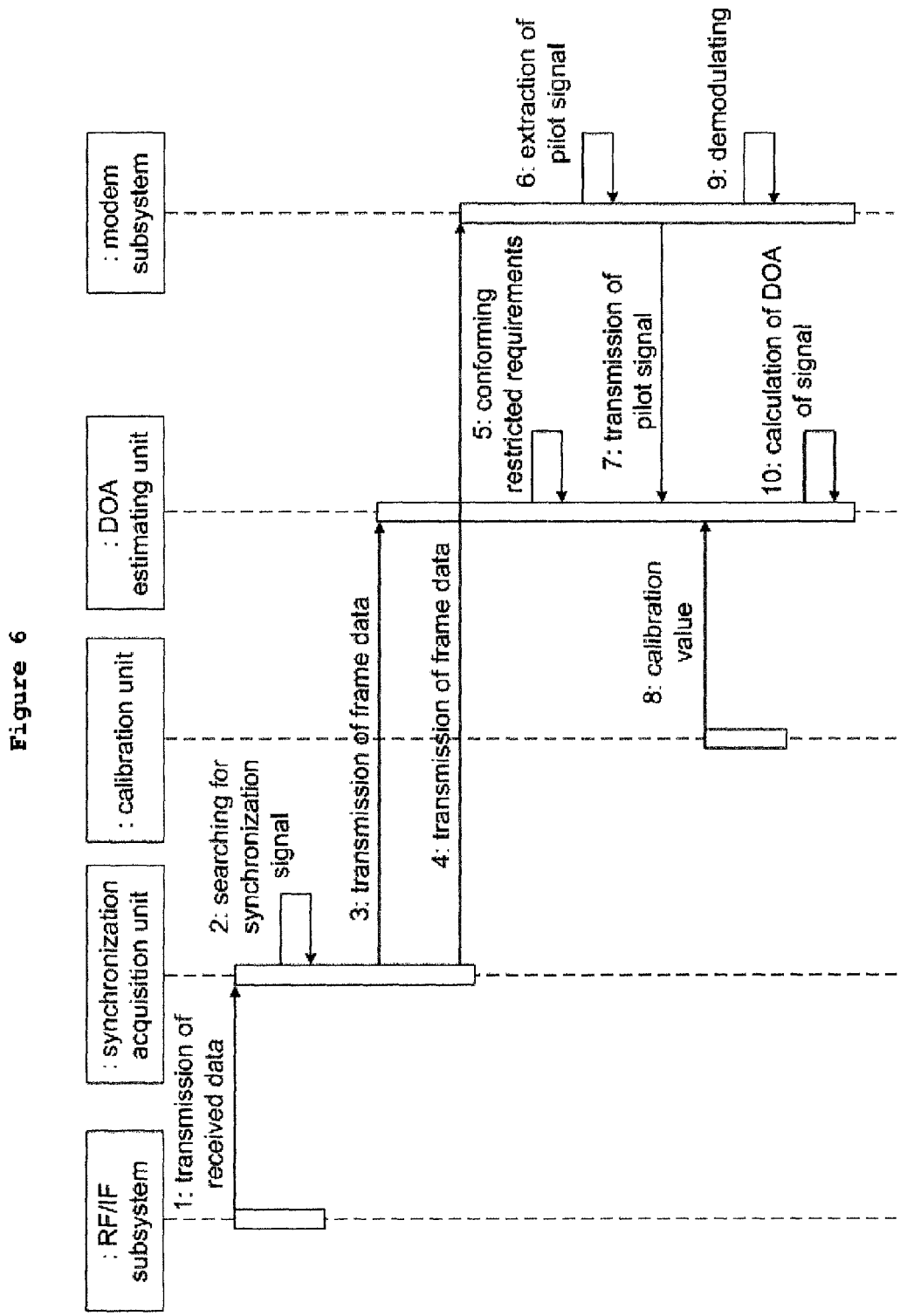
FIG. 6 is a flow chart illustrating operating procedures of the multi-antenna subsystem in a DOA (direction-of-arrival) estimation mode.

The procedures, which are taken when the multi-antenna subsystem executes the DOA estimating function, are shown in FIG. 6. When wireless signals, which are transmitted at a transmitting side, are received by the RF/IF subsystem at a receiving side, they are transmitted to the synchronization unit of the multi-antenna subsystem (step 1). The synchronization unit searches for the synchronization signal referring to the above-mentioned attribution of the synchronization unit, packetizes it symbol by symbol, and produces a frame signal by gathering the packets again (step 2). This frame data are provided to the DOA estimating unit and the modem subsystem (steps 3 and 4). The DOA estimating unit which receives the frame data selects an algorithm, that is indicated by a currently activated algorithm attribution (B. 4), from the algorithm list to be executed by the algorithm unit (B. 3) and determines the execution of the algorithm by referring to the state information indicative of an activation of the algorithm (B. 1) (step 5). When the DOA estimating algorithm is executed, the DOA is calculated (step 10) using the pilot signal which is extracted by the modem subsystem which have received the frame data (steps 6 and 7), the calibration value measured by the calibration unit (step 8), and the frame data which have been be transmitted from the synchronization unit. At this time, when several signals arrive simultaneously, the number of the signals of which arrival angles are detected is stored as the attribution value (b4, 1) and the DOAs of the detected signals are stored in the attribution of the list of the arrival angles of the detected signals (b4, 2). These stored values can be referred to by any other units.

Figure 7:
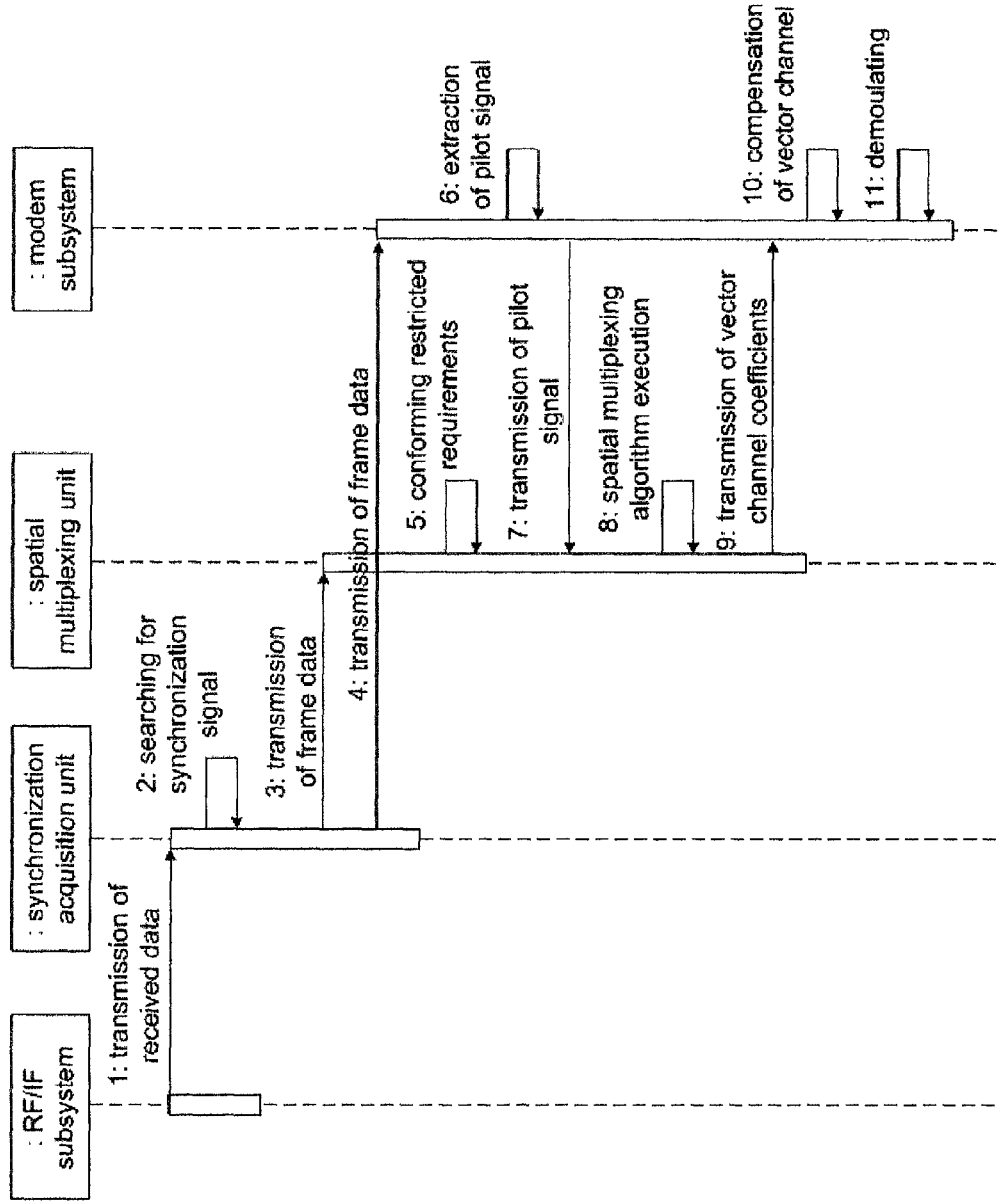
FIG. 7 is a flow chart illustrating operating procedures of the multi-antenna subsystem in a spatial multiplexing mode.

The procedures, which are taken when the multi-antenna subsystem executes the spatial multiplexing function, are shown in FIG. 7. When wireless signals, which are transmitted at a transmitting side, are received by the RF/IF subsystem at a receiving side, they are transmitted to the synchronization unit of the multi-antenna subsystem (step 1). The synchronization unit searches for the synchronization signal referring to the above-mentioned attribution of the synchronization unit, packetizes it symbol by symbol, and produces a frame signal by gathering the packets again (step 2). This frame data are provided to the spatial multiplexing unit and the modem subsystem (steps 3 and 4). The spatial multiplexing unit which receives the frame data selects a spatial multiplexing algorithm to be executed by referring to an activated spatial multiplexing algorithm attribution (b2, 2) from the list of the valid spatial multiplexing algorithms (b2, 1) (step 5). When the spatial multiplexing algorithm is executed, the vector channel coefficients are calculated (step 8) using the pilot signal which is extracted by the modem subsystem which have received the frame data (steps 6 and 7) and the frame data from the synchronization unit. The calculated vector channel coefficients are transmitted to the modem subsystem (step 9) and then a vector channel compensation is carried out (step 10).

Figure 8:
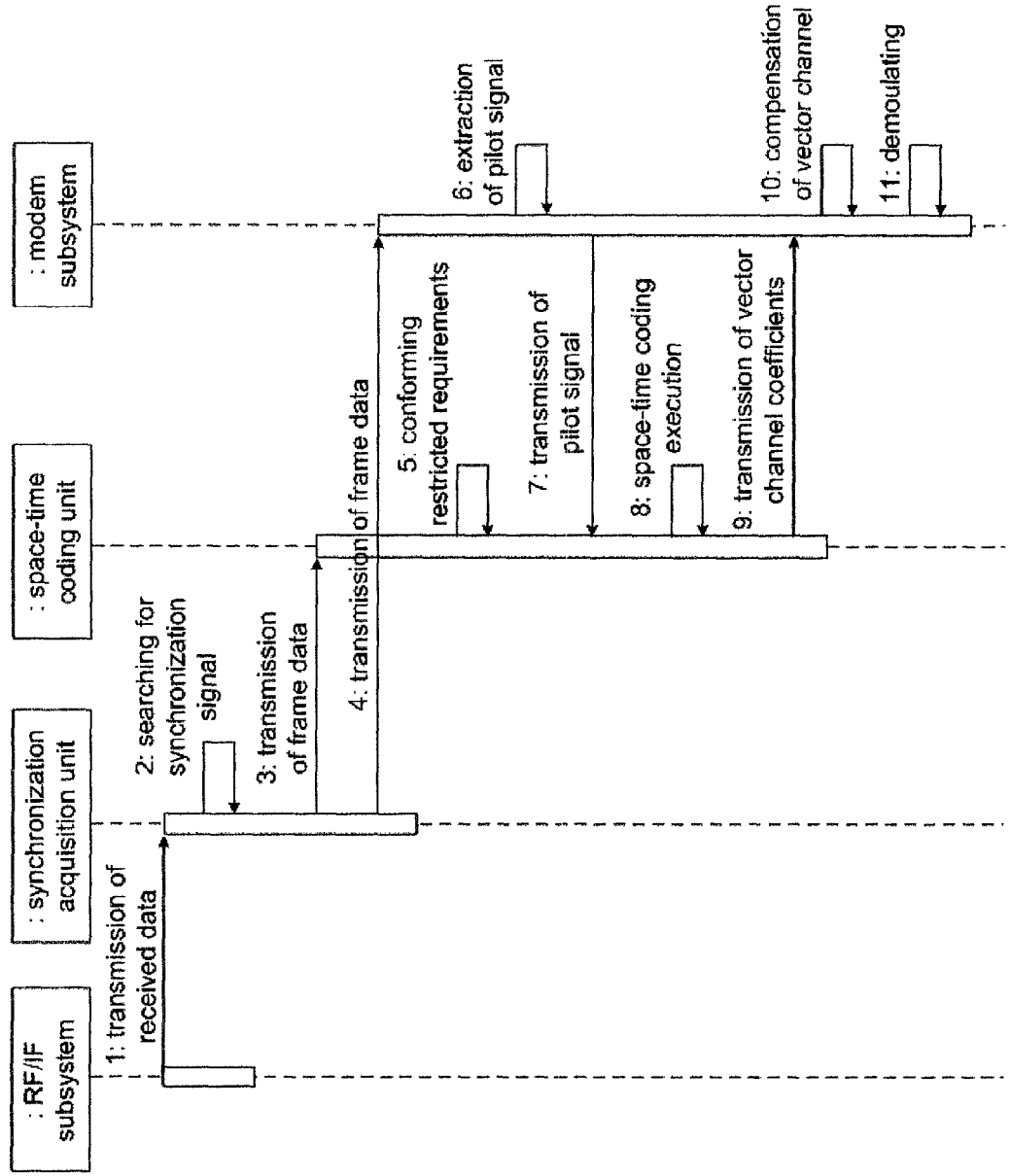
FIG. 8 is a flow chart illustrating operating procedures of the beamforming multi-antenna subsystem in a space-time coding mode.

The procedures, which are taken when the multi-antenna subsystem executes the space-time coding function, are shown in FIG. 8. When wireless signals, which are transmitted at a transmitting side, are received by the RF/IF subsystem at a receiving side, they are transmitted to the synchronization unit of the multi-antenna subsystem (step 1). The synchronization unit searches for the synchronization signal referring to the above-mentioned attribution of the synchronization unit, packetizes it symbol by symbol, and produces a frame signal by gathering the packets again (step 2). This frame data are provided to the space-time coding unit and the modem subsystem (steps 3 and 4). The space-time coding unit which receives the frame data selects an algorithm, that is indicated by a currently activated algorithm attribution (B. 4), from the algorithm list to be executed by the algorithm unit (B. 3) and determines the execution of the algorithm by referring to the state information indicative of an activation of the algorithm (B. 1) (step 5). When the space-time coding algorithm is executed, the vector channel coefficients are calculated (step 8) using the pilot signal which is extracted by the modem subsystem which have received the frame data (steps 6 and 7), the frame data from the synchronization unit and the attribution of the space-time code mapping value (b3, 1). The calculated vector channel coefficients are transmitted to the modem subsystem (step 9) and then the vector channel estimation is carried out (step 10).

The state information provides various information that the multi-antenna subsystem requires to execute the multi-antenna functions normally. Furthermore, the state information is configured to select an available algorithm from different things and to provide information about the selected algorithm. As a result, the multi-antenna system for the SDR system can be implemented through the various sate information.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

INDUSTRIAL APPLICABILITY

As apparent from the above, the multi-antenna subsystem for the SDR system described herein solves the problem of the conventional SDR system which does not support the multi-antenna system. Furthermore, the multi-antenna subsystem described herein can be employed independently in various antenna systems for supporting the multi-antenna technologies.

The invention claimed is:

1. A multi-antenna system for a SDR (Software Defined Radio) system comprising:
   an RF/IF subsystem coupled to a multi-antenna;
   a modem subsystem comprising a multiple access processing unit configured to process a signal received from the RF/IF subsystem and extract a desired user signal from the signal, a channel separator configured to separate a pilot channel from the desired user signal and a pilot separator configured to extract a pilot signal from the pilot channel; and
   a multi-antenna subsystem configured to execute multi-antenna algorithm with the RF/IF subsystem and modem subsystem, wherein the multi-antenna subsystem includes:
   an algorithm executing unit configured to execute the multi-antenna algorithm on the signal received from the RF/IF subsystem by using the pilot signal;
   a synchronization unit configured to estimate frame and symbol timing of the multi-antenna system; and
   a control unit configured to control the algorithm executing unit and the synchronization unit.

2. The multi-antenna system as recited in claim 1, wherein the algorithm executing unit is one of a beamforming algorithm executing unit, a DOA (direction-of-arrival) estimation algorithm executing unit, a spatial multiplexing algorithm executing unit, and a space-time coding algorithm executing unit.

3. The multi-antenna system as recited in claim 2, wherein the synchronization unit includes a synchronization acquisition unit and a calibration unit.

4. The multi-antenna system as recited in claim 3, wherein the beamforming algorithm executing unit provides weight vectors to the modem subsystem by executing a beamforming algorithm referring to state information indicative of an activation of the beamforming algorithm.

5. The multi-antenna system as recited in claim 3, wherein the DOA estimation algorithm executing unit calculates a DOA of a received arrival signal by executing a DOA estimation algorithm referring to state information indicative of an activation of the DOA estimation algorithm.

6. The multi-antenna system as recited in claim 5, wherein the DOA estimation algorithm executing unit stores the DOAs of the received arrival signals for reference in case where a plurality of signals arrive simultaneously.

7. The multi-antenna system as recited in claim 3, wherein the spatial multiplexing algorithm executing unit provides a vector channel coefficients to the modem subsystem by executing a spatial multiplexing algorithm referring to state information indicative of an activation of the spatial multiplexing algorithm.

8. A multi-antenna system for a SDR (Software Defined Radio) system comprising:
   an RF/IF subsystem coupled to a multi-antenna;
   a modem subsystem comprising a multiple access processing unit configured to process a signal received from the RF/IF subsystem and extract a desired user signal from the signal, a channel separator configured to separate a pilot channel from the desired user signal and a pilot separator configured to extract a pilot signal from the pilot channel; and
   a multi-antenna subsystem configured to execute at least one of plural multi-antenna algorithms with the RF/IF subsystem and modem subsystem, the multi-antenna subsystem comprising an algorithm execution unit configured to execute at least one of the plural multi-antenna algorithms on the signal received from the RF/IF subsystem by using the pilot signal from the modem subsystem,
   the multi-antenna subsystem storing and managing a list of the plural multi-antenna algorithms and state information indicative of an activation of the at least one of the plural multi-antenna algorithms.

9. The multi-antenna system as recited in claim 8, wherein the multi-antenna subsystem has state information indicative of operation mode of the algorithm unit.

10. The multi-antenna system as recited in claim 8, wherein the multi-antenna subsystem has state information indicative of currently activated algorithm among the plural multi-antenna algorithms.

11. A multi-antenna system for a SDR (Software Defined Radio) system comprising:
- an RF/IF subsystem coupled to a multi-antenna;
- a modem subsystem comprising a multiple access processing unit configured to process a signal received from the RF/IF subsystem and extract a desired user signal from the signal, a channel separator configured to separate a pilot channel from the desired user signal and a pilot separator configured to extract a pilot signal from the pilot channel; and
- a multi-antenna subsystem configured to execute at least one of plural multi-antenna algorithms with the RF/IF subsystem and modem subsystem, the multi-antenna subsystem comprising an algorithm execution unit configured to execute at least one of the multi-antenna algorithms by controlling the RF/IF subsystem and the modem subsystem,
- the algorithm execution unit comprising plural function blocks having state information to execute the multi-antenna algorithms and the state information is shared and referenced by the function blocks.

* * * * *